(12) United States Patent
Matsuo et al.

(10) Patent No.: US 8,604,109 B2
(45) Date of Patent: Dec. 10, 2013

(54) AQUEOUS BINDER FOR INORGANIC-FIBER HEAT-INSULATING SOUND-ABSORBING MEMBER, INORGANIC-FIBER HEAT-INSULATING SOUND-ABSORBING MEMBER AND METHOD FOR PRODUCING INORGANIC-FIBER HEAT-INSULATING SOUND-ABSORBING MEMBER

(71) Applicant: Asahi Fiber Glass Company, Limited, Chiyoda-ku (JP)

(72) Inventors: Atsushi Matsuo, Isehara (JP); Takuya Sakoda, Samukawa-machi (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 0 days.

(21) Appl. No.: 13/707,997

(22) Filed: Dec. 7, 2012

(65) Prior Publication Data

US 2013/0150521 A1 Jun. 13, 2013

Related U.S. Application Data

(63) Continuation of application No. PCT/JP2011/064211, filed on Jun. 22, 2011.

(30) Foreign Application Priority Data

Jun. 23, 2010 (JP) ................................. 2010-142277

(51) Int. Cl.
*C08K 3/30* (2006.01)

(52) U.S. Cl.
USPC ........... 524/247; 524/275; 524/276; 524/277; 524/416; 524/423; 524/475; 524/487; 524/556; 428/375; 428/391; 428/411.1; 428/441; 427/385.5; 442/172; 442/173; 442/180

(58) Field of Classification Search
USPC ......... 524/247, 275, 276, 277, 416, 423, 475, 524/487, 556; 428/375, 391, 411.1, 441; 427/385.5; 442/172, 173, 180
See application file for complete search history.

(56) References Cited

FOREIGN PATENT DOCUMENTS

| JP | 2005-533145 | 11/2005 | |
|---|---|---|---|
| JP | 2007-146315 | 6/2007 | |
| JP | 2007-169545 | 7/2007 | |
| JP | 2007-211161 | 8/2007 | |
| JP | 2008/150717 | 7/2008 | |
| WO | WO-2007/024020 A1 * | 3/2007 | ............ C09J 133/00 |
| WO | 2008/078615 | 7/2008 | |

* cited by examiner

OTHER PUBLICATIONS

International Search Report issued Aug. 30, 2011 in PCT/JP2011/064211 filed Jun. 22, 2011.

*Primary Examiner* — Vu A Nguyen
(74) *Attorney, Agent, or Firm* — Oblon, Spivak, McClelland, Maier & Neustadt, L.L.P.

(57) ABSTRACT

An aqueous binder for an inorganic fiber heat-insulating sound-absorbing member is cured by heating at low temperatures and is capable of providing a strong binder cured product. The inorganic fiber heat-insulating sound-absorbing member is produced by applying an aqueous binder to inorganic fibers and heating the resulting inorganic fibers at 180-220° C. The aqueous binder contains 5.5-10 parts by mass of an ammonium salt of an inorganic acid per 100 parts by mass of the total of an acrylic resin that has an acid value of 350-850 mgKOH/g and a crosslinking agent that contains at least one alkanol amine. The ratio of the total mole number of hydroxy groups, amino groups and imino groups in the crosslinking agent relative to the mole number of carboxyl groups in the acrylic resin is 0.8-1.5. The pH of the aqueous binder is adjusted to 5.0-8.0 by a basic compound.

8 Claims, 1 Drawing Sheet

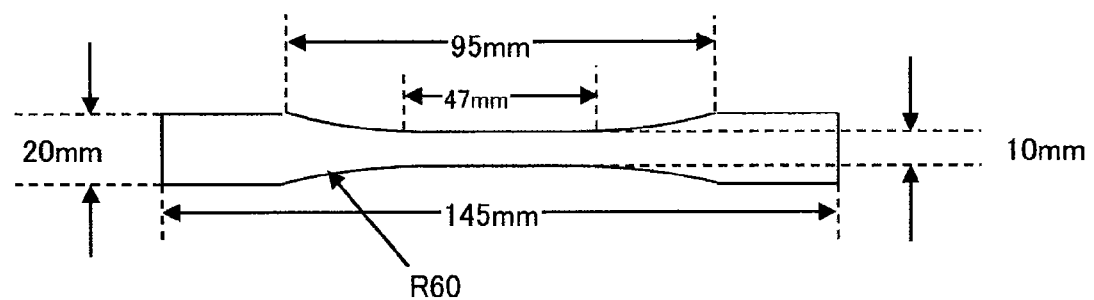

AQUEOUS BINDER FOR INORGANIC-FIBER HEAT-INSULATING SOUND-ABSORBING MEMBER, INORGANIC-FIBER HEAT-INSULATING SOUND-ABSORBING MEMBER AND METHOD FOR PRODUCING INORGANIC-FIBER HEAT-INSULATING SOUND-ABSORBING MEMBER

TECHNICAL FIELD

The present invention relates to an aqueous binder for an inorganic-fiber heat-insulating sound-absorbing member, as well as an inorganic-fiber heat-insulating sound-absorbing member and a method for producing the inorganic-fiber heat-insulating sound-absorbing member in which the aqueous binder is employed. The aqueous binder is ideally used in a heat-insulating sound-absorbing member composed of glass wool, rock wool, or another inorganic fiber; and does not contain formaldehyde.

BACKGROUND ART

Phenolic-resin binders have conventionally been in widespread used as binders for joining together the fibers in heat-insulating sound-absorbing members composed of glass wool, rock wool, or other inorganic fibers. Phenolic-resin binders are heat-cured in a relatively short period of time, and a strong binder cured product is obtained. Inorganic-fiber heat-insulating sound-absorbing members in which phenolic-resin binders are used are therefore exceptional in regard to their shape retention, thickness recovery after unpacking from a compressed state, deformation resistance, and other properties. However, when phenolic-resin binders are used, formaldehyde is released during the production process, particularly while curing the binder, and readily remains in the product. Recently, concerns related to reducing environmental load have prompted restrictions to be placed by laws and regulations on the amount of formaldehyde emitted by products. Efforts are therefore underway to produce inorganic-fiber heat-insulating sound-absorbing members using formaldehyde-free binders.

Acrylic-resin binders are a type of formaldehyde-free binder. However, under weakly acidic to weakly basic conditions, acrylic-resin binders do not readily cure, and strong binder cured products are not readily obtained. When the binder is used, the pH thereof has accordingly been adjusted to approximately 3, and curing is promoted.

However, strongly acidic binders readily corrode piping for supplying the binder, spraying devices, mesh conveyors for depositing inorganic fibers, and other production equipment; and problems have been presented in regard to rising equipment maintenance expense, equipment cost, and other expenditures. Highly acidic effluents are also discharged, and the costs of treating these effluents have also presented problems.

Aqueous binders containing an acrylic resin and a cross-linking agent containing one or more types of alkanolamine are disclosed in Patent Documents 1 and 2 below as acrylic-resin binders that are appropriate for use under weakly acidic to weakly basic conditions. In Patent Documents 1 and 2, inorganic-acid ammonium salts may also be included at 0.1 to 5 parts by mass relative to a sum of 100 parts by mass of the acrylic resin and the cross-linking agent, with the object of neutralizing the alkaline components dissolved out from the inorganic fiber and minimizing hydrolysis of the binder cured product.

RELATED ART DOCUMENTS

Patent Documents

[Patent Document 1] Japanese Laid-Open Patent Application No. 2007-146315 (claim 1, paragraph 0051)
[Patent Document 2] Japanese Laid-Open Patent Application No. 2007-211161 (claims 1 and 5, paragraphs 0058 and 0059)

DISCLOSURE OF THE INVENTION

Problems the Invention is Intended to Solve

However, although the aqueous binder disclosed in the aforementioned Patent Documents 1 and 2 has excellent curability under weakly acidic to weakly basic conditions, the heat curing must be performed at a relatively high temperature in order to carry out the cross-linking reactions (esterification, imidization, and other reactions) between the acrylic resin and the alkanolamine. Problems have therefore been presented in that energy consumption increases when curing the aqueous binder, and the cost of producing the inorganic-fiber heat-insulating sound-absorbing member rises.

It is accordingly an object of the present invention to provide an aqueous binder for an inorganic-fiber heat-insulating sound-absorbing member, as well as an inorganic-fiber heat-insulating sound-absorbing member and a method for producing the inorganic-fiber heat-insulating sound-absorbing member in which the aqueous binder is employed, where heat curing can be performed at a low temperature, and a strong binder cured product is obtained.

Means for Solving the Aforementioned Problems

Upon studying how to improve the curability of an aqueous binder composed of an acrylic resin under conditions from weakly acidic to weakly basic, the present inventors discovered that increasing the amount of an ammonium salt of an inorganic acid in the mixture improves the rate of the cross-linking reaction between the acrylic resin and an alkanolamine, allows heat curing at a low temperature, and allows a binder cured product having exceptional strength to be obtained. The object of the present invention was thus achieved.

Specifically, the aqueous binder for an inorganic-fiber heat-insulating sound-absorbing member of the present invention is an aqueous binder for an inorganic-fiber heat-insulating sound-absorbing member comprising an acrylic resin having an acid value of 350 to 850 mg KOH/g; a cross-linking agent containing at least one or more types of an alkanolamine; and an ammonium salt of an inorganic acid, characterized in that the aqueous binder contains the ammonium salt of an inorganic acid in an amount of 5.5 to 10 parts by mass relative to a total of 100 parts by mass of the acrylic resin and the cross-linking agent; the ratio of the total number of moles of hydroxyl groups, amino groups, and imino groups in the cross-linking agent to the number of moles of carboxyl groups in the acrylic resin is 0.8 to 1.5; and the pH is adjusted to 5.0 to 8.0 using a basic compound.

The acrylic resin having an acid value of 350 to 850 mg KOH/g and the cross-linking agent containing at least one or more types of the alkanolamine are contained in the aqueous binder for an inorganic-fiber heat-insulating sound-absorbing member of the present invention in the aforementioned molar ratios. The acrylic resin and the cross-linking agent therefore react without excess or deficiency upon curing, and a strong binder cured product is obtained. Since the binder does not contain formaldehyde, the environmental load can be minimized. Since the pH is adjusted to 5.0 to 8.0, production equipment is not appreciably corroded by acid; and maintenance expenditures, equipment costs, wastewater processing costs, and the like can be reduced.

The aqueous binder contains the ammonium salt of an inorganic acid in an amount of 5.5 to 10 parts by mass relative to a total of 100 parts by mass of the acrylic resin and the cross-linking agent. Curability under weakly acidic to weakly basic conditions is therefore improved, and heat-curing of the binder can be completed at relatively low temperatures. The energy required when heat-curing the binder can therefore be reduced.

In Patent Documents 1 and 2, 0.1 to 5 parts by mass of an ammonium salt of an inorganic acid relative to a total of 100 parts by mass of the acrylic resin and the cross-linking agent may be included, with the object of neutralizing the alkaline components dissolved out from the inorganic fiber; however, the object of using the ammonium salt of an inorganic acid differs from that in present invention. The amount of the ammonium salt of an inorganic acid present is therefore less in Patent Documents 1 and 2 than in the present invention.

The weight-average molecular weight of the acrylic resin is preferably 1,000 to 15,000 in the aqueous binder for an inorganic-fiber heat-insulating sound-absorbing member of the present invention. Increases in the viscosity of the binder can thereby be limited, and the fluidity of the binder during spraying and before initiating the curing reaction is improved. Furthermore, the binder becomes densely cross-linked, the strength of the resulting binder cured product is improved, and the binding (adhesion strength) between the fibers can be strengthened.

The cross-linking agent preferably comprises at least one or more types of dialkanolamine in the aqueous binder for an inorganic-fiber heat-insulating sound-absorbing member of the present invention. Imino groups react with carboxyl groups more rapidly than hydroxyl groups, and slowly and incompletely cross-linked portions of the binder resulting from steric hindrance are minimized. The curing time can therefore be shortened, and productivity can be improved. The strength of the resulting binder cured product is also improved.

The aqueous binder for an inorganic-fiber heat-insulating sound-absorbing member of the present invention preferably contains the ammonium salt of an inorganic acid in an amount of 6 to 9 parts by mass relative to a total of 100 parts by mass of the acrylic resin and the cross-linking agent. The ammonium salt of an inorganic acid is also preferably ammonium sulfate. According to this aspect, the curability of the binder is improved, and the strength of the resulting binder cured product is improved.

The aqueous binder for an inorganic-fiber heat-insulating sound-absorbing member of the present invention preferably contains a silane coupling agent in an amount of 0.5 to 1.7 parts by mass relative to a total of 100 parts by mass of the acrylic resin, the cross-linking agent, and the ammonium salt of an inorganic acid. Including the silane coupling agent in the aforementioned proportion allows adhesion at the interface between the inorganic fiber and the binder to be improved, and the physical properties of the inorganic-fiber heat-insulating sound-absorbing member obtained using the aqueous binder to be improved.

The inorganic-fiber heat-insulating sound-absorbing member of the present invention is characterized in being obtained by applying the aforementioned aqueous binder for an inorganic-fiber heat-insulating sound-absorbing member to an inorganic fiber; and heat-curing the aqueous binder for an inorganic-fiber heat-insulating sound-absorbing member.

The method for producing an inorganic-fiber heat-insulating sound-absorbing member of the present invention is characterized in that the aforementioned aqueous binder for an inorganic-fiber heat-insulating sound-absorbing member is applied to an inorganic fiber; and heated at 180 to 220° C. so as to cure the aqueous binder for an inorganic-fiber heat-insulating sound-absorbing member.

Effect of the Invention

Since the aqueous binder for an inorganic-fiber heat-insulating sound-absorbing member of the present invention is composed of an acrylic resin and does not contain formaldehyde, curing does not release formaldehyde. The environmental load of exhaust gas and the like can therefore be minimized. Curability is excellent, the cross-linking reaction of the binder proceeds rapidly even when the heat-curing temperature is low, and a strong binder cured product is obtained.

The inorganic-fiber heat-insulating sound-absorbing member of the present invention obtained using the aqueous binder for an inorganic-fiber heat-insulating sound-absorbing member has the same physical properties as members in which conventional phenolic-resin binders are used, without any decrease in the thickness of the heat-insulating member, which relates to the heat-insulating and sound-absorbing functionality, or in the rigidity, which relates to the self-standing property during construction, due to environmental conditions, e.g., air temperature or humidity. The inorganic-fiber heat-insulating sound-absorbing member of the present invention is therefore ideal for use as a heat insulator or sound-absorbing member in residences, buildings, and other structures; or as the core member of a vacuum heat-insulating member.

Since the binder can be heat-cured at a lower temperature, the energy required when heat-curing the binder can be further reduced, and an inorganic-fiber heat-insulating sound-absorbing member having various exceptional physical properties can be produced with high productivity.

BRIEF DESCRIPTION OF THE DRAWINGS

FIG. 1 is a schematic diagram of a test article created as a production example for tension testing.

BEST MODE FOR CARRYING OUT THE INVENTION

The aqueous binder for an inorganic-fiber heat-insulating sound-absorbing member of the present invention contains an acrylic resin.

The acrylic resin employed in the present invention is a polymer or copolymer obtained from polymerizing monomers that include ethylenically unsaturated carboxylic acid monomers.

Examples of ethylenically unsaturated carboxylic acid monomers include acrylic acid, methacrylic acid, crotonic acid, fumaric acid, maleic acid, 2-methyl maleic acid, itaconic acid, 2-methyl itaconic acid, α-β-methylene glutaric acid, monoalkyl maleic acid, monoalkyl fumarate, maleic anhydride, acrylic anhydride, β-(meth)acryloyloxyethylene hydrogen phthalate, β-(meth)acryloyloxyethylene hydrogen maleate, and β-(meth)acryloyloxyethylene hydrogen succinate. Acrylic acid is preferable in consideration of issues such as controlling the molecular weight of the acrylic resin.

Maleic acid or fumaric acid is preferable in cases where the acid value of the acrylic resin is adjusted to a high level of 700 mg KOH/g or more.

In regard to adjusting the acid value of the acrylic resin, ethylenically unsaturated monomers that do not contain carboxylic acid groups can also be used in combination with ethylenically unsaturated carboxylic acid monomers.

There are no particular limitations as to the ethylenically unsaturated monomer that does not contain a carboxylic acid group, as long as formaldehyde cannot be released during heat curing. Acrylic monomers, vinyl monomers, amide monomers, unsaturated aliphatic hydrocarbons, styrene monomers, vinyl ester monomers, acrilonitrile, glycidyl (meth)acrylate, and the like can be used. One, two, or more types can be used in combination. However, N-methyloyl (meth)acrylamide and methyl-N-methyloyl(meth)acrylamide produce cross-linking reactions and release formadelyde upon heating, and accordingly are not recommended for use.

Examples of the acrylic monomers include methyl(meth)acrylate, ethyl(meth)acrylate, n-butyl(meth)acrylate, isobutyl(meth)acrylate, t-butyl(meth)acrylate, 2-ethylhexyl(meth)acrylate, cetyl(meth)acrylate, n-stearyl(meth)acrylate, diethylene-glycol ethoxy(meth)acrylate, methyl-3-methoxy (meth)acrylate, ethyl-3-methoxy(meth)acrylate, butyl-3-methoxy(meth)acrylate, cyclohexyl(meth)acrylate, benzyl (meth)acrylate, isobornyl(meth)acrylate, tetrahydrofurfurylacrylate, 2-hydroxyethylacrylate, 2-hydroxypropylacrylate, 4-hydroxybutylacrylate, trihydric or higher polyol mono(meth)acrylate, aminoalkyl(meth)acrylate, N-alkylaminoalkyl(meth)acrylate, and N,N-dialkylaminoalkyl(meth)acrylate.

Examples of the vinyl monomers include vinylalkyl ether, N-alkylvinyl amine, N,N-dialkylvinyl amine, N-vinyl pyridine, N-vinyl imidazole, and N-(alkyl)aminoalkylvinyl amine.

Examples of the amide monomers include (meth)acrylamide, N-alkyl(meth)acrylamide, N,N-dialkyl(meth)acrylamide, N,N-dialkylaminoalkyl(meth)acrylamide, diacetone (meth)acrylamide, N-vinyl formamide, N-vinyl acetamide, and N-vinyl pyrrolidone.

Examples of the unsaturated aliphatic hydrocarbons include ethylene, propylene, isobutylene, isoprene, and butadiene.

Examples of the styrene monomers include styrene, α-methyl styrene, p-methoxystyrene, vinyl toluene, p-hydroxystyrene, p-acetoxystyrene.

Examples of the vinyl ester monomers include vinyl acetate and vinyl propionate.

The acid value of the acrylic resin is from 350 to 850 mg KOH/g, preferably 450 to 750 to mg KOH/g, and more preferably 550 to 750 mg KOH/g. When the acid value of the acrylic resin is less than 350 mg KOH/g, defects readily form in the cross-linking structure of the binder cured product, and the strength and rigidity of the binder cured product tend to decrease. The thickness recovery after unpacking the inorganic-fiber heat-insulating sound-absorbing member from a compressed state (hereinafter called as "recovery") and the rigidity of the member when used as a board therefore decrease, and heat insulation and sound absorption are readily impaired. Workability during construction is also readily impaired. When the acid value of the acrylic resin exceeds 850 mg KOH/g, the cross-linking structure of the binder cured product is dense, and the strength is readily impaired to be brittle. The recovery of the inorganic-fiber heat-insulating sound-absorbing member and the rigidity of the member when used as a board are therefore impaired, and the desired functionality may not be achieved. Unreacted carboxyl groups also readily remain in the binder cured product after curing, and, e.g., under conditions of high humidity, the binder cured product absorbs moisture, the inter-fiber bond strength provided by the binder decreases, and other problems may occur.

The acid value of the acrylic resin in the present invention is given by the number of milligrams of potassium hydroxide required to neutralize 1 g of the acrylic resin.

The weight-average molecular weight of the acrylic resin is preferably 1,000 to 15,000, more preferably 2,000 to 10,000, and particularly preferably 2,000 to 5,000. When the weight-average molecular weight of the acrylic resin exceeds 15,000, the viscosity of the binder tends to increase markedly after sublimation of water components, the fluidity of the binder during or after application to the inorganic fiber readily deteriorates, and difficulty tends to be encountered in uniformly applying the binder to the inorganic fiber. The adhesiveness of binder that has adhered to the inorganic fiber also readily increases. Inorganic fibers to which the binder adheres then adhere to production lines, and the production lines become soiled, or the fibers on the surface of the inorganic-fiber heat-insulating sound-absorbing member aggregate; and partial deficiencies in appearance and in the thickness dimension, among other problems, may be presented in the resulting product. When the weight-average molecular weight of the acrylic resin is less than 1,000, the heat during curing causes the binder components to be readily sublimated as fumes, and the amount of binder adhering to the inorganic fiber readily decreases. Various physical properties of the inorganic-fiber heat-insulating sound-absorbing member therefore readily degrade.

The aqueous binder for an inorganic-fiber heat-insulating sound-absorbing member of the present invention contains a cross-linking agent containing at least one or more types of alkanolamine.

Ethanolamine, isopropanolamine, other monoalkanolamines, diethanolamine, diisopropanolamine, other dialkanolamines, triethanolamine, triisopropanolamine, and other trialkanolamines can be used as the alkanolamine. Among these, dialkanolamine is preferable, and from an economical standpoint diethanolamine is particularly preferable.

Alkanolamines contain amino and/or imino groups, which react with carboxyl groups more rapidly than the hydroxyl groups in the molecule. Therefore, when producing the inorganic-fiber heat-insulating sound-absorbing member, the curing temperature is reduced, the curing time is shortened, or the proportion of binder cross-links is improved, whereby the productivity and physical properties of the inorganic-fiber heat-insulating sound-absorbing member can be improved. Dialkanolamine has particularly high reactivity with carboxyl groups, and slowly and incompletely cross-linked portions of the binder resulting from steric hindrance can be minimized. The curing time can therefore be further shortened. The strength of the resulting binder cured product is also further improved.

The cross-linking agent employed in the present invention may also further include a polyol other than an alkanolamine.

There are no particular limitations as to the aforementioned polyol, but water-soluble polyols are preferable. Examples include aliphatic polyols, sugars, polyester polyols, glycols, and acrylic-resin polyols. One, two, or more types of polyol can be used in combination.

Examples of the aliphatic polyol include 1,2-ethanediol (ethylene glycol) and dimers or trimers thereof, 1,2-propanediol (propylene glycol) and dimers or trimers thereof, 1,3-propanediol, 2,2-methyl-1,3-propanediol, 2-butyl-2- ethyl-1,3-propanediol, 1,3-butanediol, 1,4-butanediol, 2-methyl-2,4-butanediol, 1,5-pentanediol, 3-methyl-1,5-pentanediol, 2-methyl-2,4-pentanediol, 1,6-hexanediol, 1,4-cyclohexanediol, 2-ethyl-1,3-hexanediol, 2-hydroxymethyl-2-methyl-1,3-propanediol, 2-ethyl-2-hydroxymethyl-2-methyl-1,3-propanediol, 1,2,6-hexanetriol, and 2,2-bis (hydroxymethyl)-2,3-propanediol.

Examples of the sugars include glucose, fructose, mannitol, sorbitol, and maltitol.

Examples of the polyester polyols include polyester polyols of the aforementioned aliphatic polyols and/or sugars, and phthalic acid, adipic acid, azelaic acid, or the like.

Examples of the glycols include polyethylene glycol and polypropylene glycol.

The polyol other than an alkanolamine is preferably less than 200 parts by mass, and more preferably less than 100 parts by mass relative to 100 parts by mass of the alkanolamine. If the polyol content of the cross-linking agent is less than 200 parts by mass relative to 100 parts by mass of the alkanolamine, the binder will have excellent curability under weakly acidic to weakly basic conditions.

The aqueous binder for an inorganic-fiber heat-insulating sound-absorbing member of the present invention contains the acrylic resin and the cross-linking agent such that the ratio of the total number of moles of hydroxyl groups, amino groups, and imino groups in the cross-linking agent to the number of moles of carboxyl groups in the aforementioned acrylic resin is 0.8 to 1.5. The molar ratio is preferably 0.9 to 1.2 and more preferably 0.95 to 1.1. When the molar ratio is less than 0.8, the carboxyl groups of the acrylic resin tend to remain after curing the binder. When molar ratio exceeds 1.5, the alkanolamine tends to remain after curing the binder. Therefore, when the molar ratio is outside the aforementioned range, the physical properties of the binder cured product readily deteriorate, and the recovery, tension strength, tear load, and other physical properties of the inorganic-fiber heat-insulating sound-absorbing member obtained using the aqueous binder readily decrease due to high humidity or other environmental factors. If the molar ratio is within the aforementioned range, the cross-linking structure is formed between the acrylic resin and the cross-linking agent without excess or deficiency when curing the binder. Therefore, the binder cured product will have robust strength, and various physical properties of the inorganic-fiber heat-insulating sound-absorbing member obtained using the aqueous binder can be made optimal.

The aqueous binder for an inorganic-fiber heat-insulating sound-absorbing member of the present invention contains an ammonium salt of an inorganic acid.

Examples of ammonium salts of inorganic acids include ammonium sulfate, ammonium nitrate, ammonium sulfite, ammonium phosphate, ammonium phosphite, ammonium hypophosphite, ammonium polyphosphate, ammonium chloride, diammonium hydrogen phosphate, ammonium dihydrogen phosphate, ammonium hydrogen carbonate, ammonium thiosulfate, ammonium hyposulfite, ammonium chlorate, diammonium peroxodisulfate, and aluminum ammonium sulfate. Among these, ammonium sulfate is preferable due to having an effect of promoting the cross-linking reaction between the alkali-based resin and the cross-linking agent.

The amount of the ammonium salt of an inorganic acid present is 5.5 to 10 parts by mass, preferably 6 to 9 parts by mass, and more preferably 6 to 8 parts by mass, relative to a total of 100 parts by mass of the acrylic resin and the cross-linking agent. When the amount is less than 5.5 parts by mass, the reactivity between the acrylic resin and the cross-linking agent cannot be substantially improved, and heat curing at low temperatures is difficult. When the amount exceeds 10 parts by mass, the moisture resistance of the binder cured product tends to decrease. Including the ammonium salt of an inorganic acid in the aforementioned proportion allows the binder to be heat-cured at a low temperature (preferably 180 to 220° C., and more preferably 180 to 195° C.) and allows a binder cured product having superior moisture resistance, strength, and other physical properties to be obtained.

Mixing the inorganic ammonium salt into the binder with the object of neutralizing alkaline components dissolved out from the inorganic fiber and limiting hydrolysis of the binder cured product was also performed in Japanese Laid-Open Patent Application No. 2007-146315, Japanese Laid-Open Patent Application No. 2007-211161, and the like, but in the present invention the ammonium salt of an inorganic acid is included with the object of promoting the cross-linking reaction between the alkali-based resin and the cross-linking agent, allowing the binder to be heat cured at a lower temperature, and allowing a strong binder cured product to be obtained. A larger amount of the inorganic ammonium salt is therefore included in the mixture than in the prior art.

The aqueous binder for an inorganic-fiber heat-insulating sound-absorbing member of the present invention may further contain a catalyst other than the ammonium salt of an inorganic acid. Such a catalyst may promote the cross-linking reaction between the acrylic resin and the alkanolamine. Examples include sodium hypophosphite, potassium hypophosphite, calcium hypophosphite, magnesium hypophosphite, and other hypophosphite salts; tris(3-hydroxypropyl) phosphine and other organic phosphate compounds; tetraethyl phosphonium salts, triethylbenzyl phosphonium salts, tetra-n-butyl phosphonium salts, tri-n-butylmethyl phosphonium salts, and other quaternary phosphonium salts; boron trifluoride amine complexes, zinc chloride, aluminum chloride, magnesium chloride, and other Lewis-acid compounds; and titanium lactate, titanium triethanolaminate, zirconyl acetate, and other water-soluble organometallic compounds. One, two, or more types of these compounds may be used in combination. Among these, calcium hypophosphite and tris(3-hydroxypropyl)phosphine have a significant effect of promoting curing even in small amounts, and do not impair the moisture resistance of the binder cured product even when left within the binder cured product; accordingly, they are preferable.

The catalyst content is preferably 10 parts by mass or less, more preferably 0.1 to 10 parts by mass, and particularly preferably 0.5 to 5 parts by mass, relative to a total of 100 parts by mass of the acrylic resin and the cross-linking agent. These catalysts have less of an effect than the ammonium salt of an inorganic acid, and therefore, from the perspective of material costs, need not particularly be included.

The aqueous binder for an inorganic-fiber heat-insulating sound-absorbing member of the present invention preferably contains at least one type of a water dispersion selected from waxes or mixtures of waxes and heavy oils.

The aqueous binder for an inorganic-fiber heat-insulating sound-absorbing member of the present invention preferably contains a silane coupling agent. The silane coupling agent acts as an interface between the inorganic fiber and the binder and can improve the adhesion of the binder to the inorganic fiber.

Examples of the silane coupling agent include aminosilane coupling agents and epoxysilane coupling agents. One, two, or more types thereof can be used in combination.

Examples of the aminosilane coupling agents include γ-aminopropyltriethoxy silane, γ-(2-aminoethyl)aminopropyltrimethoxy silane, and γ-(2-aminoethyl)aminopropylmethyldimethoxy silane.

Examples of the epoxysilane coupling agent include γ-glycidoxypropyltrimethoxy silane and γ-glycidoxypropylmethyldimethoxy silane.

The silane coupling agent content is preferably 0.5 to 1.7 parts by mass, more preferably 0.55 to 1.65 parts by mass, and particularly preferably 0.6 to 1.6 parts by mass, relative to the a total of 100 parts by mass of the acrylic resin, the cross-linking agent, and the ammonium salt of an inorganic acid. When the content is less than 0.5 parts by mass, the aforementioned effect is substantially not obtained. When the content exceeds 1.7 parts by mass, the aforementioned effect does not substantially improve.

The aqueous binder for an inorganic-fiber heat-insulating sound-absorbing member of the present invention may also as necessary contain dust-inhibiting agents, colorants, and the like.

The acrylic resin, the cross-linking agent, the ammonium salt of an inorganic acid, and, as necessary, other raw materials are mixed using a tank fitted with a stirrer or other dissolver, the pH is adjusted to 5.0 to 8.0 using a basic compound, and the aqueous binder for an inorganic-fiber heat-insulating sound-absorbing member of the present invention is produced.

Examples of the format of the aqueous binder include emulsions, colloidal dispersions, and water-soluble compositions. Among these, use in the format of a water-soluble composition is preferable.

The pH of the aqueous binder for an inorganic-fiber heat-insulating sound-absorbing member of the present invention is 5.0 to 8.0, preferably 6.0 to 8.0, and more preferably 6.0 to 7.0. When the pH is less than 5.0, long use may corrode production equipment, and wastewater processing costs are incurred. When the pH exceeds 8.0, the cross-linking reaction between the alkali-based resin and the cross-linking agent slows down, and the binder will not complete curing, or a longer period of time will be necessary to complete curing. The recovery, self-standing property, and various other physical properties of the resulting inorganic-fiber heat-insulating sound-absorbing member are readily impaired. If the pH of the aqueous binder for an inorganic-fiber heat-insulating sound-absorbing member is within the aforementioned range, corrosion of production equipment can be limited, and wastewater processing is also simple. Maintenance expenditures can therefore be reduced.

There are no particular limitations as to the method for adjusting the pH; however, using a basic compound is preferable, and using a volatile basic compound is more preferable. Examples of volatile basic compounds include aqueous ammonia or amines. In consideration of odor produced during curing or other concerns, aqueous ammonia is preferable.

The amount of the aqueous binder for an inorganic-fiber heat-insulating sound-absorbing member of the present invention in solid form is preferably 5 to 40 percent by mass, and more preferably 10 to 30 percent by mass. When the amount of the solid form is less than 5 percent by mass, the amount in aqueous form increases, and the curing step requires more time. When the amount of the solid form exceeds 40 percent by mass, viscosity increases, and the fluidity of the binder decreases.

The aqueous binder for an inorganic-fiber heat-insulating sound-absorbing member is applied to inorganic fibers, the aqueous binder is heat cured, and the inorganic-fiber heat-insulating sound-absorbing member of the present invention is produced. A specific example will be described in further detail.

Melted inorganic raw materials are first fibrillized using a fibrillizing device, and inorganic fibers are produced. The inorganic fiber is not particularly limited, but glass wool and rock wool are examples. Flame methods, blowing methods, centrifugal methods (also called rotary methods), and various other methods can be used as the fibrillization method. Centrifugal methods are preferable, particularly in cases where the inorganic fiber is glass wool.

The aqueous binder for an inorganic-fiber heat-insulating sound-absorbing member is then applied to the inorganic fibers using a spraying device or the like. The amount of the binder applied differs depending on the density or intended use of the inorganic-fiber heat-insulating sound-absorbing member. The amount of binder expressed in terms of solids is preferably in the range of 0.5 to 15 percent by mass, and more preferably the range of 0.5 to 10 percent by mass, using the amount by mass of the inorganic fiber which has been applied by the binder as a reference. As long as the binder is applied to the inorganic fiber after fibrillization, the timing is not restricted; however, application directly after fibrillization is preferable in order to efficiently apply the binder.

The inorganic fibers to which the binder has been applied are then deposited on a perforated conveyor, and a bulky intermediate is formed. When the inorganic fibers to which the binder has been applied are deposited on the perforated conveyor, it is more preferable to use a suctioning device to suction the inorganic fibers from the side opposite the perforated conveyor on which the inorganic fibers are deposited.

The intermediate, which is moving continuously on the perforated conveyor, is then fed into a pair of upper and lower perforated conveyors providing a gap such that the desired thickness is reached, and simultaneously the binder is cured by heated air, and a mat is formed. The mat is cut to the desired width and length, whereby the inorganic-fiber heat-insulating sound-absorbing member is obtained.

The temperature for heat-curing the binder is preferably 180 to 220° C., and more preferably 180 to 195° C. The aqueous binder for an inorganic-fiber heat-insulating sound-absorbing member of the present invention has exceptional curability. Sufficient heat curing can be achieved even at low temperatures of 220° C. or less, and a strong binder cured product can be formed. The temperature of heat curing may exceed 220° C., but from the economic standpoint of increased energy consumption such temperatures are not preferable.

The time for heat curing is adjusted appropriately in the range of 30 seconds to 10 minutes depending on the density or thickness of the inorganic-fiber heat-insulating sound-absorbing member.

Since the resulting inorganic-fiber heat-insulating sound-absorbing member of the present invention does not release formaldehyde while heat-curing the binder, the environmental load is less than that encountered with conventional phenolic formaldehyde binders.

The inorganic-fiber heat-insulating sound-absorbing member of the present invention may be used in the original format or may be used covered by a surface covering. Paper, synthetic-resin films, metal-foil films, non-woven cloth, woven cloth, or combinations thereof can be used as the surface covering.

The density of the inorganic-fiber heat-insulating sound-absorbing member of the present invention should allow use as a normal heat-insulating material or sound-absorbing material and is preferably in the range of 5 to 300 kg/m$^3$.

EXAMPLES

The present invention will be described in further detail below using examples.

Aqueous Binder for an Inorganic-Fiber Heat-Insulating Sound-Absorbing Member

Example 1

100 parts by mass expressed in terms of solids of a resin solution (solids: 45%), which resulted from dissolving an acrylic resin (acid value: 690 mg KOH/g, weight-average molecular weight: 2,000) composed of acrylic acid and methyl acrylate in water, and 37.18 parts by mass of monoethanolamine as the cross-linking agent were mixed together, and a resin mixture was obtained.

To 100 parts by mass of the resulting resin mixture were added 8 parts by mass of ammonium sulfate and 6 parts by mass of sodium hypophosphite. The pH was adjusted to 6.5 using 25% aqueous ammonia, and a water-soluble composition was obtained.

To 100 parts by mass of the resulting water-soluble composition was added 0.8 parts by mass of γ-aminopropyltriethoxysilane. After stirring, the mixture was diluted so that the solids content was 15%, and the aqueous binder of Example 1 was obtained.

Example 2

The aqueous binder of Example 2 was obtained in the same manner as in Example 1, except that 42.66 parts by mass of diethanolamine was used instead of the monoethanolamine used in Example 1.

Example 3

The aqueous binder of Example 2 was obtained in the same manner as in Example 3, except that 60.54 parts by mass of triethanolamine was used instead of the monoethanolamine used in Example 1.

Example 4

The aqueous binder of Example 4 was obtained in the same manner as in Example 2, except that 8 parts by mass of ammonium phosphate was used instead of the ammonium sulfate used in Example 2.

Example 5

The aqueous binder of Example 5 was obtained in the same manner as in Example 2, except that the amount of γ-aminopropyltriethoxysilane compounded in Example 5 was 0.3 parts by mass.

Example 6

The aqueous binder of Example 6 was obtained in the same manner as in Example 2, except that the amount of sodium hypophosphite compounded in Example 6 was 3 parts by mass.

Comparative Example 1

The aqueous binder of Comparative Example 1 was obtained in the same manner as in Example 1, except that the amount of ammonium sulfate compounded in Comparative Example 1 was 2 parts by mass.

Comparative Example 2

The aqueous binder of Comparative Example 2 was obtained in the same manner as in Example 2, except that the amount of ammonium sulfate compounded in Comparative Example 2 was 2 parts by mass.

Comparative Example 3

The aqueous binder of Comparative Example 3 was obtained in the same manner as in Example 3, except that the amount of ammonium sulfate compounded in Comparative Example 3 was 2 parts by mass.

Comparative Example 4

The aqueous binder of Comparative Example 4 was obtained in the same manner as in Example 4, except that the amount of ammonium sulfate compounded in Comparative Example 4 was 2 parts by mass.

Comparative Example 5

The aqueous binder of Comparative Example 5 was obtained in the same manner as in Example 2, except that the ammonium sulfate in Example 2 was not added.

Comparative Example 6

The aqueous binder of Comparative Example 6 was obtained in the same manner as in Example 2, except that the amount of ammonium sulfate compounded in Comparative Example 6 was 2 parts by mass, and the amount of sodium hypophosphite compounded was 12 parts by mass.

Comparative Example 7

The aqueous binder of Comparative Example 7 was obtained in the same manner as in Example 5, except that the amount of ammonium sulfate compounded in Comparative Example 7 was 2 parts by mass.

Comparative Example 8

The aqueous binder of Comparative Example 8 was obtained in the same manner as in Example 6, except that the amount of ammonium sulfate compounded in Comparative Example 8 was 2 parts by mass.

Comparative Example 9

The aqueous binder of Comparative Example 9 was obtained in the same manner as in Example 2, except that the amount of ammonium sulfate compounded in Comparative Example 9 was 15 parts by mass.

The compositions of the aqueous binders of Examples 1 through 6 and Comparative Examples 1 through 9 are given in Tables 1 and 2 below.

TABLE 1

|  |  | Example 1 | Example 2 | Example 3 | Example 4 | Example 5 | Example 6 |
|---|---|---|---|---|---|---|---|
| Acrylic resin (parts by mass) | | 100 | 100 | 100 | 100 | 100 | 100 |
| Cross-linking agent (parts by mass) | Monoethanolamine | 37.18 | — | — | — | — | — |
| | Diethanolamine | — | 42.66 | — | 42.66 | 42.66 | 42.66 |
| | Triethanolamine | — | — | 60.54 | — | — | — |
| *[1]Catalyst | Ammonium sulfate | 8 | 8 | 8 | — | 8 | 8 |
| | Ammonium phosphate | — | — | — | 8 | — | — |
| | Sodium hypophosphite | 6 | 6 | 6 | 6 | 6 | 3 |
| *[2]Coupling agent | γ-Aminopropyltriethoxy silane | 0.8 | 0.8 | 0.8 | 0.8 | 0.3 | 0.8 |
| (Number of moles of carboxyl groups in acrylic resin)/(Total number of moles of hydroxyl, amino, and imino groups in cross-linking agent) | | 1 | 1 | 1 | 1 | 1 | 1 |
| pH | | 6.5 | 6.4 | 6.6 | 6.4 | 6.2 | 6.5 |

*[1]Parts by mass relative to a total of 100 parts by mass of the acrylic resin and the cross-linking agent
*[2]Parts by mass relative to 100 parts by mass of the acrylic resin, the cross-linking agent, and the catalyst

TABLE 2

|  |  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|
| Acrylic resin (parts by mass) | | 100 | 100 | 100 | 100 | 100 | 100 | 100 | 100 | 100 |
| Cross-linking agent (parts by mass) | Monoethanolamine | 37.18 | — | — | — | — | — | — | — | — |
| | Diethanolamine | — | 42.66 | — | 42.66 | 42.66 | 42.66 | 42.66 | 42.66 | 42.66 |
| | Triethanolamine | — | — | 60.54 | — | — | — | — | — | — |
| *[1]Catalyst | Ammonium sulfate | 2 | 2 | 2 | — | — | 2 | 2 | 2 | 15 |
| | Ammonium phosphate | — | — | — | 2 | — | — | — | — | — |
| | Sodium hypophosphite | 6 | 6 | 6 | 6 | 6 | 12 | 6 | 3 | 6 |
| *[2]Coupling agent | γ-Aminopropyltriethoxy silane | 0.8 | 0.8 | 0.8 | 0.8 | 0.8 | 0.8 | 0.3 | 0.8 | 0.8 |
| (Number of moles of carboxyl groups in acrylic resin)/(Total number of moles of hydroxyl, amino, and imino groups in cross-linking agent) | | 1 | 1 | 1 | 1 | 1 | 1 | 1 | 1 | 1 |
| pH | | 6.7 | 6.5 | 6.2 | 6.3 | 6.4 | 6.1 | 6.4 | 6.6 | 6.1 |

*[1]Parts by mass relative to a total of 100 parts by mass of the acrylic resin and the cross-linking agent
*[2]Parts by mass relative to 100 parts by mass of the acrylic resin, the cross-linking agent, and the catalyst Inorganic-Fiber Heat-Insulating Sound-Absorbing Member Production Example 1

Each of the aqueous binders of Examples 1 through 6 and Comparative Examples 1 through 9 was applied by spraying to achieve a predetermined amount of adhesion on glass fibers that had been fibrillized using centrifugation. The fibers were then deposited on a perforated conveyor while being suctioned by a suctioning device, and intermediates of inorganic-fiber heat-insulating sound-absorbing members were formed.

The intermediates were heated for three minutes in a hot-air oven at 190° C., and inorganic-fiber heat-insulating sound-absorbing members having a density of 10 kg/m³, a thickness of 100 mm, and an amount of adhered binder of 6% were obtained.

The end-surface portions of the resulting inorganic-fiber heat-insulating sound-absorbing members were held in chucks in the thickness direction in a universal testing machine, and the tear load (kgf) was measured at a rate of 1 m/min.

Production Example 2

Each of the aqueous binders of Examples 1 through 6 and Comparative Examples 1 through 9 was applied by spraying to achieve a predetermined amount of adhesion on glass-fiber filter paper ([GA-100] (Advantec)). The samples were then heated for 3 minutes at 190° C. in a hot-air oven. The amount of impregnated binder was 6% (the amount by weight of cured binder, on the basis of the amount by weight of glass). The cured glass-fiber filter paper was cut as shown in FIG. 1, and samples for tension tests were obtained.

These samples were held in chucks in a tension-testing machine ([TA.XTplus Texture Analyser] (Stable Micro Systems)). The samples were pulled apart at a rate of 3 mm/min until tearing, and the tension-fracture strength was measured (prior to dipping in hot water).

The samples were dipped in hot water at 105° C. for 15 minutes. After removing the samples from the hot water, tension testing was immediately performed in the same manner, and the tension-fracture strength was measured (after dipping in hot water).

Production Example 3

Heating was performed for 3 minutes in a hot-air oven having a curing temperature of 260° C. in Production Example 2. Otherwise samples for tension testing were obtained in the same manner as Production Example 2.

Tension testing was performed on the resulting samples in the same manner as in Production Example 2, and the tension-fracture strengths of the samples were measured before and after dipping in hot water was performed.

The results of the above are summarized in Tables 3 and 4.

effect was pronounced in cases where the samples were dipped in hot water, and uncured components were removed. It can therefore be seen that the binders in the Examples can be sufficiently cured even when the heat-curing temperature is 190° C.

TABLE 3

| Test item | Inorganic-fiber heat-insulating sound-absorbing member used | Aqueous binder used | | | | | |
|---|---|---|---|---|---|---|---|
| | | Example 1 | Example 2 | Example 3 | Example 4 | Example 5 | Example 6 |
| Tear load (kgf) | Production example 1 | 6.4 | 10.3 | 8.4 | 8.9 | 9.0 | 8.9 |
| Tension-fracture strength (N) | Production example 2 (prior to dipping in hot water) 190° C. | 30.53 | 38.29 | 35.97 | 37.94 | 38.11 | 36.64 |
| | Production example 2 (after dipping in hot water) 190° C. | 28.15 | 36.79 | 34.14 | 36.04 | 36.55 | 35.10 |
| | Production example 3 (prior to dipping in hot water) 260° C. | 30.67 | 40.52 | 36.02 | 39.12 | 40.02 | 38.45 |
| | Production example 3 (after dipping in hot water) 260° C. | 29.08 | 39.53 | 34.72 | 38.10 | 38.78 | 37.10 |
| Loss of tension-fracture strength between before and after dipping in hot water (%) | Production example 2 190° C. | 7.8 | 3.9 | 5.1 | 5.0 | 4.1 | 4.2 |
| | Production example 3 260° C. | 5.2 | 2.4 | 3.6 | 2.6 | 3.1 | 3.5 |

TABLE 4

| Test item | Inorganic-fiber heat-insulating sound-absorbing member used | Aqueous binder used | | | | | | | | |
|---|---|---|---|---|---|---|---|---|---|---|
| | | Comparative example 1 | Comparative example 2 | Comparative example 3 | Comparative example 4 | Comparative example 5 | Comparative example 6 | Comparative example 7 | Comparative example 8 | Comparative example 9 |
| Tear load (kgf) | Production example 1 | 5.1 | 8.4 | 5.8 | 7.0 | 5.0 | 8.3 | 7.8 | 6.1 | 5.4 |
| Tension-fracture strength (N) | Production example 2 (prior to dipping in hot water) 190° C. | 21.33 | 31.23 | 21.56 | 26.02 | 18.59 | 30.86 | 29.00 | 22.68 | 20.07 |
| | Production example 2 (after dipping in hot water) 190° C. | 18.92 | 29.10 | 19.66 | 24.20 | 16.00 | 28.73 | 26.79 | 20.64 | 15.66 |
| | Production example 3 (prior to dipping in hot water) 260° C. | 31.01 | 40.38 | 35.98 | 38.76 | 32.53 | 39.89 | 38.40 | 37.34 | 37.62 |
| | Production example 3 (after dipping in hot water) 260° C. | 29.37 | 39.49 | 34.83 | 37.64 | 29.37 | 38.93 | 37.02 | 35.96 | 34.50 |
| Loss of tension-fracture strength between before and after dipping in hot water (%) | Production example 2 190° C. | 11.3 | 6.8 | 8.8 | 7.0 | 13.9 | 6.9 | 7.6 | 9.0 | 22.0 |
| | Production example 3 260° C. | 5.3 | 2.2 | 3.2 | 2.9 | 9.7 | 2.4 | 3.6 | 3.7 | 8.3 |

As follows from Tables 3 and 4, the inorganic-fiber heat-insulating sound-absorbing members obtained using the aqueous binders for an inorganic-fiber heat-insulating sound-absorbing member of the present invention (Examples 1 through 6) had high tear loads and tension-fracture strength, and no problems were presented in actual usage despite the low heat-curing temperature of the binders.

The impairment of tension-fracture strength of the Examples was substantially the same when comparing heat curing of the binders performed at 190° C. and at 260° C. The By contrast, in the Comparative Examples, the impairment of tension-fracture strength in cases where heat-curing of the binder was performed at 190° C. was larger than at 260° C. It can therefore be seen that curing of the binder have been inadequate at a heat-curing temperature of 190° C.

The invention claimed is:
1. An aqueous binder for an inorganic-fiber heat-insulating sound-absorbing member, comprising:
an acrylic resin having an acid value of 350 to 850 mg KOH/g;

a cross-linking agent comprising one or more types of an alkanolamine; and an ammonium salt of an inorganic acid, wherein the aqueous binder comprises the ammonium salt of an inorganic acid in an amount of 5.5 to 10 parts by mass relative to a total of 100 parts by mass of the acrylic resin and the cross-linking agent;

a molar ratio of the total number of moles of hydroxyl groups, amino groups, and imino groups in the cross-linking agent to the number of moles of carboxyl groups in the acrylic resin is 0.8 to 1.5; and the pH is adjusted to 5.0 to 8.0 using a basic compound.

2. The aqueous binder of claim 1, wherein the weight-average molecular weight of the acrylic resin is 1,000 to 15,000.

3. The aqueous binder of claim 1, wherein the cross-linking agent comprises one or more types of dialkanolamine.

4. The aqueous binder according to claim 1, wherein the aqueous binder comprises the ammonium salt of an inorganic acid in an amount of 6 to 9 parts by mass relative to a total of 100 parts by mass of the acrylic resin and the cross-linking agent.

5. The aqueous binder of claim 1, wherein the ammonium salt of an inorganic acid is ammonium sulfate.

6. The aqueous binder of claim 1, further comprising a silane coupling agent in an amount of 0.5 to 1.7 parts by mass relative to a total of 100 parts by mass of the acrylic resin, the cross-linking agent, and the ammonium salt of an inorganic acid.

7. An inorganic-fiber heat-insulating sound-absorbing member, obtained by applying the aqueous binder of claim 1 to an inorganic fiber and heat-curing the aqueous binder.

8. A method for producing an inorganic-fiber heat-insulating sound-absorbing member, the method comprising applying the aqueous binder of claim 1 to an inorganic fiber and heating the aqueous binder at 180 to 220° C. to cure the aqueous binder.

* * * * *